(12) United States Patent
Yanbe

(10) Patent No.: US 6,510,449 B1
(45) Date of Patent: Jan. 21, 2003

(54) DATA TRANSMISSION SYSTEM

(75) Inventor: Haruki Yanbe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/322,155

(22) Filed: May 23, 1999

(30) Foreign Application Priority Data

Jul. 15, 1998 (JP) .......................................... 10-200476

(51) Int. Cl.$^7$ ............................. G06F 15/16; H04L 5/14
(52) U.S. Cl. .................... 709/201; 370/294; 340/870.13
(58) Field of Search ................... 708/800, 801, 708/835, 836; 379/242, 258, 268, 290; 370/276–277, 280, 284, 310, 313–316, 319, 321, 464, 478, 915; 360/22–23; 340/870.01, 870.11, 870.13; 709/201

(56) References Cited

U.S. PATENT DOCUMENTS

| | | | | |
|---|---|---|---|---|
| 3,806,654 | A | * 4/1974 | Dooley et al. | ............... 370/365 |
| 4,604,618 | A | * 8/1986 | Akiba et al. | ................ 340/3.51 |
| 5,469,464 | A | * 11/1995 | De Groote et al. | ......... 375/317 |
| 5,754,535 | A | * 5/1998 | Vandenabeele et al. | ..... 370/321 |
| 6,256,317 | B1 | * 7/2001 | Holloway et al. | .......... 370/447 |

FOREIGN PATENT DOCUMENTS

| | | |
|---|---|---|
| JP | 5-30126 | 2/1993 |
| JP | 5-259945 | 10/1993 |
| JP | 08214060 | 8/1996 |
| JP | 09261221 | 10/1997 |

OTHER PUBLICATIONS

TTC Standard, "ISDN Basic User Network Interface Layer 1 Specification" Feb. 4, 1997, Telecommunication Technology Committee JT–1430.

* cited by examiner

Primary Examiner—Zarni Maung
Assistant Examiner—Wen-Tai Lin
(74) Attorney, Agent, or Firm—Venable; Norman N. Kunitz; Jeffrey W. Gluck

(57) ABSTRACT

In the data transmission system according to the present invention, a master apparatus transmits data to a plurality of slave apparatuses during a time block T1-1 and the individual slave apparatuses transmit data for the master apparatus during a time block T1-3. Slave apparatus control signals transmitted by the master apparatus for the individual slave apparatuses are transmitted through a control channel group 31 having time slots that correspond to the individual slave apparatuses, whereas master apparatus control signals for the master apparatus transmitted by the individual slave apparatuses are transmitted through a control channel group 35 having time slots that correspond to the individual slave apparatuses. Consequently, even though the data transmission system is constituted through the point-multipoint connection using a 2-wire metallic transmission line, data do not collide with one another in data transmission between the master apparatus and the plurality of slave apparatuses to achieve efficient data transmission.

16 Claims, 7 Drawing Sheets

(A): transmission channel at master apparatus 3
(B): reception channel at master apparatus 3
(C): transmission channel at first slave apparatus 7-1
(D): transmission channel at second slave apparatus 7-2
(E): transmission channel at nth slave apparatus 7-n

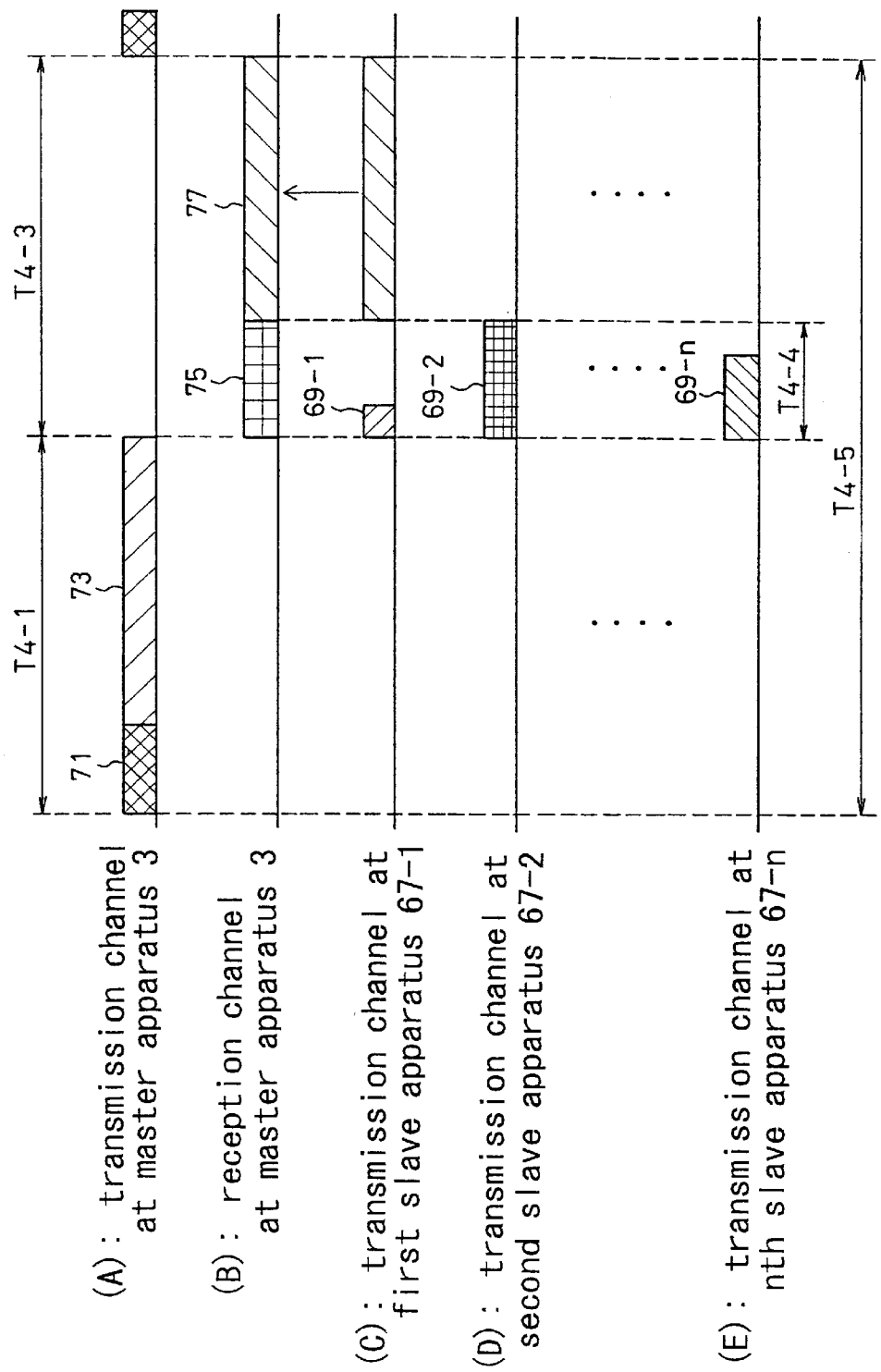

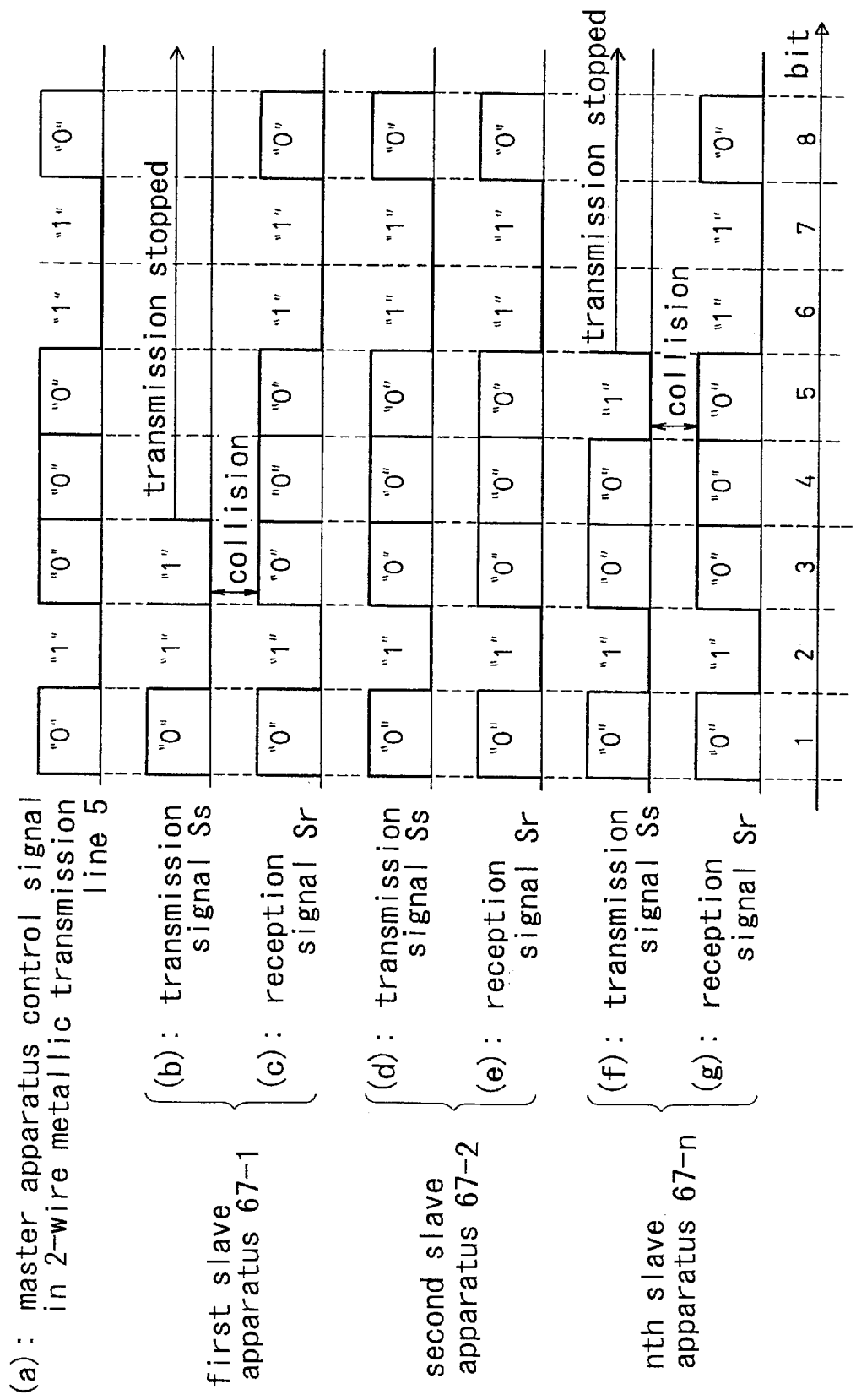

DATA TRANSMISSION SYSTEM

BACKGROUND OF THE INVENTION

The present invention relates to a data transmission system and, in particular, it relates to a digital data transmission system constituted throughpoint-multipoint connection.

A digital data transmission system adopting point-multipoint connection conforming to the TTC (Telecommunication Technology Committee) Standard JT-I430 (reference: TTC standard ISDN User-Network Interface Layer 1 Specifications Standard No. JT-I430 Telecommunication Technology Committee Associated Corporation) is employed in transmission of data such as voice that require realtime quality among a plurality of devices under normal circumstances.

Through the point-multipoint connection in an ISDN user-network interface, a plurality of terminals can be connected through connectors to a main wiring connected to a DSU (digital service unit) to afford advantages such as easy wiring, efficient wiring and easy terminal connection.

SUMMARY OF THE INVENTION

Now, an analog data transmission system normally employs a 2-wire metallic transmission line, whereas a digital data transmission system in the prior art adopting the point-multipoint connection employs a 4-wire metallic transmission line comprising two wires each for transmission and reception. Since the number of wires in the transmission line is doubled, the cost of the transmission line is higher. In addition, it is necessary to provide pulse transformers for data transmission and data reception in the individual terminals connected to the main wiring cable, which makes it difficult to achieve a high degree of compactness for the terminals and ultimately results in an increase in the scale of the data transmission system itself.

Furthermore, when a 2-wire metallic transmission line is already wired in a normal residential building, it can be converted to a digital data transmission system adopting the point-multipoint connection either by adding two new wires or by discarding the existing two wires and installing a 4-wire transmission line. However, it is not easy to modify a transmission line regardless of which method is employed, which has been one of the negative factors that deters conversion to digital data transmission systems.

Accordingly, an object of the present invention is to provide a data transmission system constituted through a point-multipoint connection employing a 2-wire metallic transmission line, which achieves efficient data transmission without individual sets of data colliding with each other in data transmission between a master apparatus and a plurality of slave apparatuses.

In order to achieve the object described above, a data transmission system constituted by achieving point-multipoint connection for a master apparatus and a plurality of slave apparatuses is provided. The data transmission system is characterized in that the master apparatus transmits data to the plurality of slave apparatuses during one time block and the individual slave apparatuses transmit data to the master apparatus during another time block. Since this structure allows the data to be transmitted from the master apparatus to the individual slave apparatuses and the data to be transmitted from the slave apparatuses to the master apparatus to be transmitted on the transmission line during different time blocks, data do not collide even if the transmission line is constituted of, for instance, two wires.

The one time block may include a first time block and a second time block. In that case, the master apparatus may transmit a slave apparatus control signal for controlling one or two or more slave apparatuses during the first time block and transmit an information signal for providing specific information to one or two or more slave apparatuses during the second time block.

Apparatus ID numbers may be allotted to the individual slave apparatuses so that the apparatus ID numbers are included in the slave apparatus control signal transmitted by the master apparatus. By adopting this structure, the master apparatus can select one or two or more slave apparatuses among the plurality of slave apparatuses with ease. For instance, by allowing data to be transmitted only to the selected slave apparatuses, data collision in the 2-wire transmission line is prevented to achieve efficient data transmission.

Time slots corresponding to the individual slave apparatuses may be set within the first time block. This will make it possible to transmit slave apparatus control signals for the individual slave apparatuses from the master apparatus without them colliding with each other in a 2-wire transmission line.

The other time block may include a third time block and a fourth time block. In that case, one or two or more slave apparatuses may transmit a master apparatus control signal for controlling the master apparatus during the third time block and transmit an information signal for providing the master apparatus with specific information during the fourth time block.

By setting time slots corresponding to the individual slave apparatuses in the third time block, it becomes possible to transmit master apparatus control signals from the individual slave apparatuses to the master apparatus without them colliding with each other in, for instance, a 2-wire transmission line.

A data detection circuit may be provided at each slave apparatus for monitoring transmission line data that are being transmitted through a transmission line connecting the master apparatus and the individual slave apparatuses, since this will enable the individual slave apparatuses to transmit data in correspondence to the presence/absence of transmission data in the transmission line.

In addition, the data detection circuits provided at the individual slave apparatuses each count the number of continuous codes indicating a specific logic level in the monitored transmission line data and each prompts a data transmission circuit provided at the corresponding slave apparatus to start transmission of transmission data when the number of continuous codes has reached the count value set for each data detection circuit. For instance, in a data transmission implemented through the HDLC (High Level Data Link Control) procedures, under normal circumstances, data "1" are not continuous in a succession of 7 sets or more in the transmission line, and if the data "1" are continuous, it means that neither the master apparatus nor any of the plurality of slave apparatuses is engaged in data transmission. Thus, by setting the count value as necessary in conformance to a communication protocol, the individual slave apparatuses are able to detect the presence/absence of data in the data transmission line and to transmit transmission data without resulting in the transmission data colliding with data transmitted by the master apparatus or by another slave apparatus.

By increasing the count value when the transmission of the transmission data transmitted by an individual slave apparatus is completed and reducing the count value when the transmission of the transmission data transmitted by the slave apparatus has been stopped, a slave apparatus having completed a data transmission will give another slave apparatus an opportunity to perform the next data transmission. Thus, all the slave apparatuses will have equal opportunity for data transmission.

The data detection circuits provided at the individual slave apparatuses each compare the transmission data transmitted by the corresponding slave apparatus and the transmission line data and if their codes do not match, issue instructions to the data transmission circuit provided inside the slave apparatus to stop the transmission of the transmission data. Thus, even when a plurality of slave apparatuses have started data transmission at the same time, data collision in the transmission line is prevented. In addition, by assigning data that correspond to the apparatus ID numbers of the individual slave apparatuses to the leading bit to a specific bit of the data transmitted by the slave apparatus, a given slave apparatus is selected at an earlier stage. As a result, the selected slave apparatus can transmit a specific information signal within a shorter period of time, the other slave apparatuses are prevented from being engaged in wasteful data transmission and, consequently, a more efficient data transmission is realized for the entire data transmission system.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIG. 6 is a timing chart illustrating the operation performed by the digital data transmission system in FIG. 5; and FIG. 7 is a timing chart illustrating the operation performed by the slave apparatuses in the digital data transmission system in FIG. 5.

DETAILED DESCRIPTION OF THE PREFERRED EMBODIMENTS

The following is a detailed explanation of the preferred embodiments of the data transmission system according to the present invention in reference to the attached drawings. It is to be noted that the same reference numbers are allotted to components having roughly the same functions and structural features to preclude the necessity for repeated explanation thereof.

First Embodiment

Figure 1:
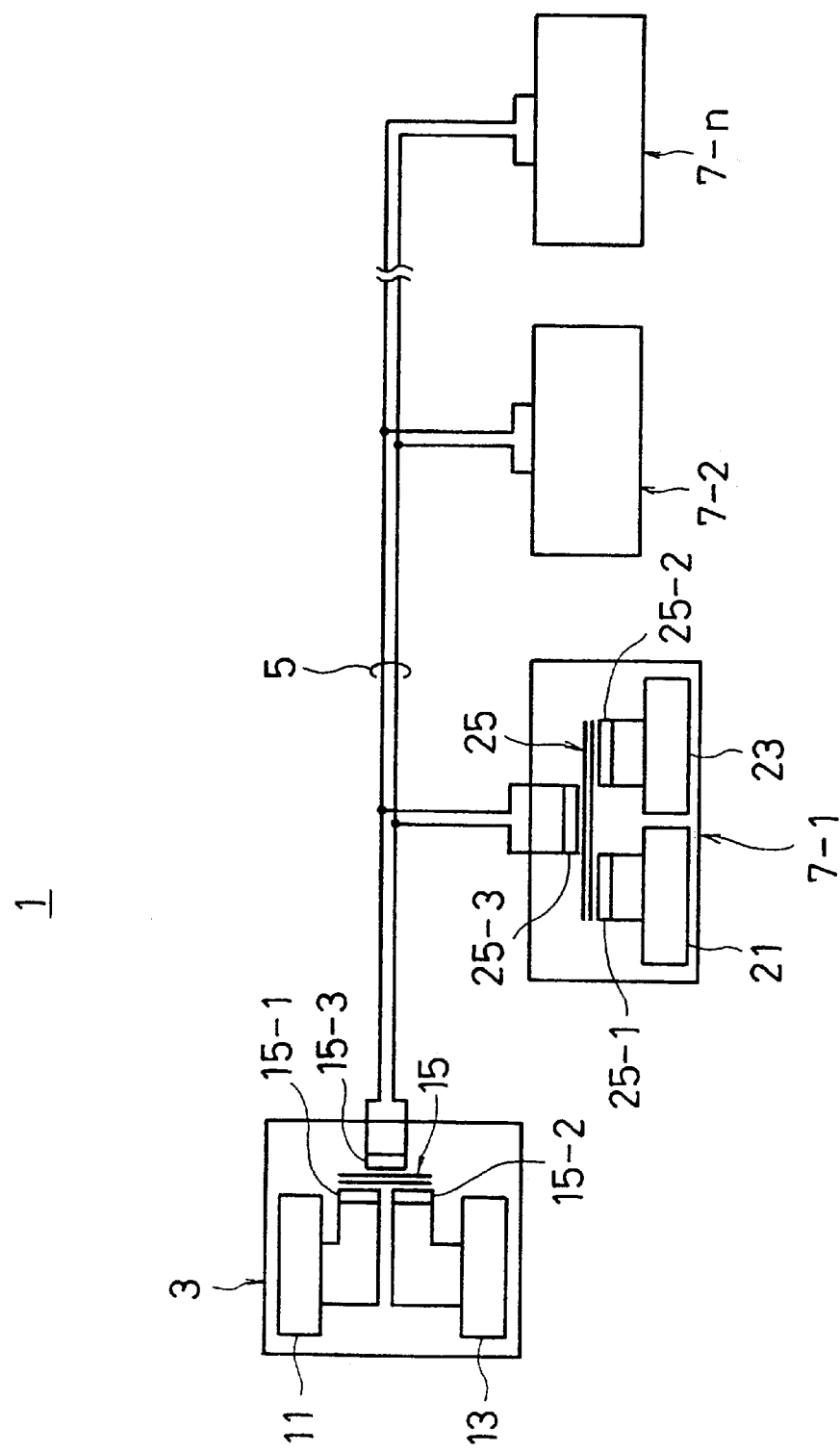
FIG. 1 is a block diagram illustrating the structure of the digital data transmission system in a first embodiment of the present invention.

FIG. 1 shows the structure of a digital data transmission system 1 in the first embodiment of the present invention. The digital data transmission system 1 comprises a master apparatus 3, a 2-wire metallic transmission line 5 and a first slave apparatus 7-1, a second slave apparatus 7-2 . . . , an nth slave apparatus 7-n.

The master apparatus 3 is provided with a transmission circuit 11, a reception circuit 13 and a pulse transformer 15, with the transmission circuit 11 connected to a first winding 15-1 of the pulse transformer 15 and the reception circuit 13 connected to a second winding 15-2 of the pulse transformer 15. In addition, the 2-wire metallic transmission line 5 is connected to a third winding of the pulse transformer 15.

Continuous apparatus ID numbers are pre-allotted to the n slave apparatuses, i.e., the first slave apparatus 7-1, the second slave apparatus 7-2, . . . , the nth slave apparatus 7-n. Since the input/output portions of the individual slave apparatuses have almost identical structural features to one another, the explanation will focus on the first slave apparatus 7-1 as a typical example.

The first slave apparatus 7-1 is provided with a transmission circuit 21, a reception circuit 23 and a pulse transformer 25, with the transmission circuit 21 connected to a first winding 25-1 of the pulse transformer 25 and the reception circuit 23 connected to a second winding 25-2 of the pulse transformer 25. A third winding 25-3 of the pulse transformer 25 is connected to the 2-wire metallic transmission line 5. The other slave apparatuses, i.e., the second slave apparatus 7-2, . . . , the nth slave apparatus 7-n are likewise connected to the 2-wire metallic transmission line 5.

Figure 2:
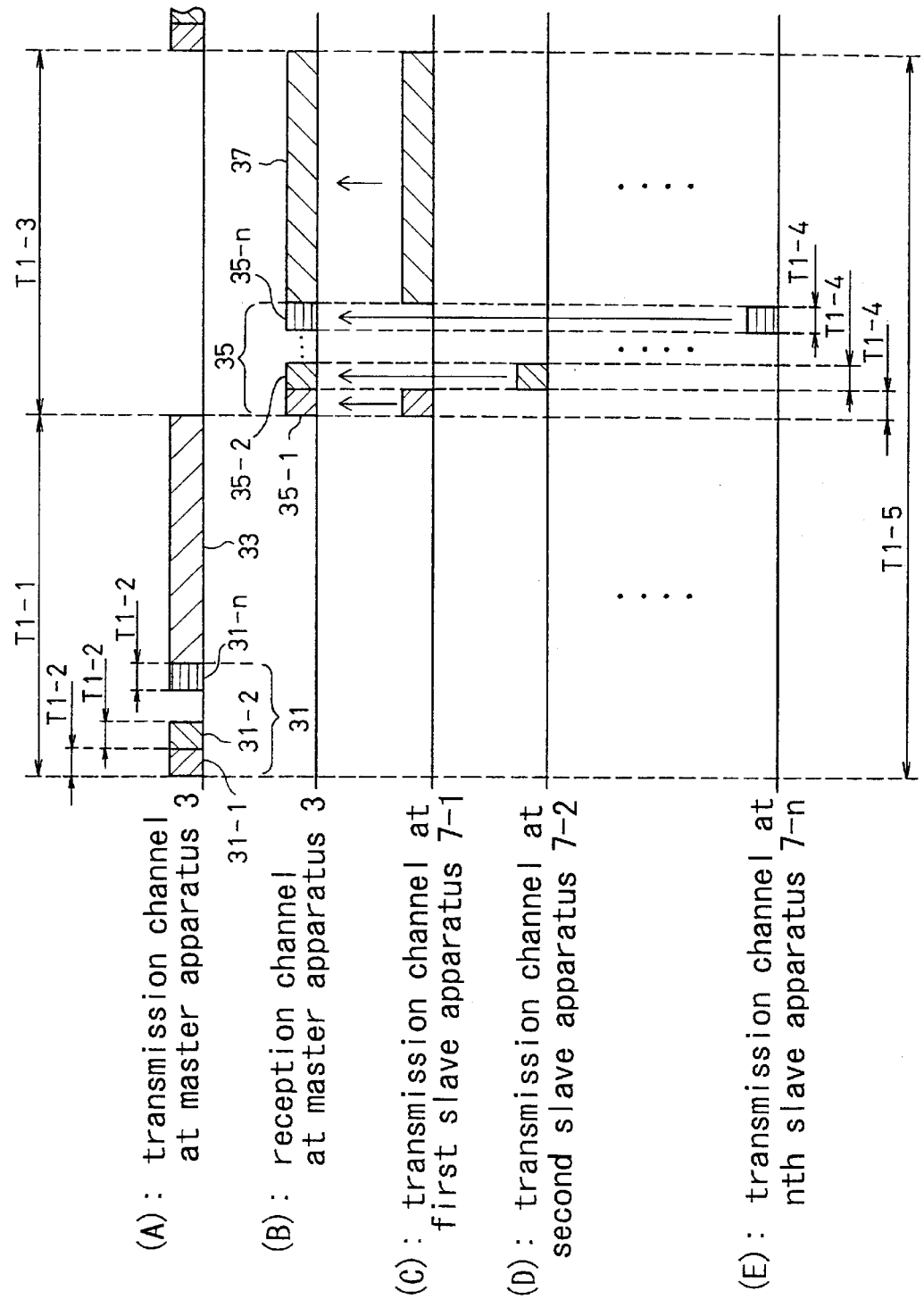
FIG. 2 is a timing chart illustrating the operation performed by the digital data transmission system in FIG. 1.

The operation of the digital data transmission system 1 in the first embodiment which is structured as described above is illustrated in FIG. 2. (A) in FIG. 2 illustrates the structure of a transmission channel in the master apparatus 3, and instructions, responses and the like (hereafter referred to as the "slave apparatus control signals") and data, voice and the like (hereafter referred to as "information signals") that are transmitted through the transmission channel of the master apparatus 3 are received by the first slave apparatus 7-1, the second slave apparatus 7-2, . . . , the nth slave apparatus 7-n. (B) in FIG. 2 illustrates the structure of a reception channel in the master apparatus 3. The reception channel is achieved by combining the individual transmission channels at all the slave apparatuses, i.e., the first slave apparatus 7-1, the second slave apparatus 7-2, . . . , the nth slave apparatus 7-n. In addition, (C) in FIG. 2 illustrates the structure of the transmission channel at the first slave apparatus 7-1, (D) in FIG. 2 illustrates the structure of the transmission channel in the second slave apparatus 7-2 and (E) in FIG. 2 illustrates the structure of the transmission channel in the nth slave apparatus 7-n.

The transmission channel at the master apparatus 3 comprises n control channels 31-1, 31-2, . . . , 31-n for transmitting slave apparatus control signals for the individual slave apparatuses and a data channel 33 for transmitting an information signal for one or two or more specific slave apparatuses, as illustrated at (A) in FIG. 2. The transmission of slave apparatus control signals and information signals is implemented during a time block In a control channel group 31 constituted of the n control channels 31-1, 31-2, . . . 31-n, the individual control channels are allotted to n time slots each lasting a time block T1-2. The control channels 31-1, 31-2, . . . 31-n respectively correspond to the first slave apparatus 7-1, the second slave apparatus 7-2, . . . , the nth slave apparatus 7-n, and are allotted to the time slots corresponding to the apparatus ID numbers that are allotted to the individual slave apparatuses in advance.

As illustrated at (B) in FIG. 2, the master apparatus 3 receives requests, responses and the like (hereafter referred to as "master apparatus control signals") from the individual slave apparatuses and information signals from specific slave apparatuses through its reception channels during a time block T1-3. These reception channels comprise n control channels 35-1, 35-2, . . . , 35-n for individually transmitting master apparatus control signals from the slave apparatuses to the master apparatus 3 and a data channel 37 for transmitting information signals from specific slave apparatuses to the master apparatus 3. The transmission of an information signal to the master apparatus 3 is allowed only for a slave apparatus that has been granted permission with a slave apparatus control signal transmitted by the master apparatus 3, and in this context, an explanation is given on an example in which such permission has been granted to the first slave apparatus 7-1, as illustrated in FIG. 2.

The individual control channels 35-1, 35-2, . . . , 35-n in a control channel group 35 are allotted to n time slots each having a time width over a time block T1-4. In addition, the control channels 35-1, 35-2, . . . , 35-n respectively correspond to the first slave apparatus 7-1, the second slave apparatus 7-2, . . . , the nth slave apparatus 7-n, and are allotted to time slots at positions that correspond to the apparatus ID numbers pre-allotted to the individual slave apparatuses.

The data transmission between the master apparatus 3 and the individual slave apparatuses 7-1, 7-2, . . . , 7-n structured as described above is executed repeatedly over a cycle of time blocks T1-5 (=(time block T1-1)+(time block T1-3)).

Next, the data transmission performed in the digital data transmission system 1 in the first embodiment is explained in further detail.

First, the first slave apparatus 7-1, the second slave apparatus 7-2, . . . , the nth slave apparatus 7-n receive slave apparatus control signals through the control channels 31-1, 31-2, . . . , 31-n of the master apparatus 3.

One or two or more slave apparatuses that have been selected by the slave apparatus control signals transmitted by the master apparatus 3 then receive an information signal through the data channel 33 in succession after the slave apparatus control signal.

After an information signal is received through the data channel 33 of the master apparatus 3, the first slave apparatus 7-1, the second slave apparatus 7-2, . . . , the nth slave apparatus 7-n transmit master apparatus control signals for the master apparatus 3 through the control channels 35-1, 35-2, . . . , 35-n at time slot positions that correspond to the apparatus ID numbers pre-allotted to the individual slave apparatuses. The master apparatus 3 then receives the master apparatus control signals through the control channel group 35 comprising these control channels 35-1, 35-2, . . . , 35-n.

When the transmission of the master apparatus control signals is completed, a slave apparatus that has been granted permission to perform transmission of an information signal with a slave apparatus control signal from the master apparatus 3, e.g., the first slave apparatus 7-1, transmits an information signal to the master apparatus 3 through the data channel 37.

The transmission of the master apparatus control signals by the individual slave apparatuses 7-1, 7-2, . . . , 7-n through the control channels 35-1, 35-2, . . . , 35-n and the transmission of an information signal by a specific slave apparatus to which permission has been granted by the master apparatus 3 through the data channel 37 are completed within the time block T1-3.

As explained above, the data transmission from the master apparatus 3 to the individual slave apparatuses 7-1, 7-2, . . . , 7-n and the data transmission from the individual slave apparatuses 7-1, 7-2, . . . , 7-n to the master apparatus 3 are switched to change transmission directions over specific time intervals through the so-called TCM (Time Compression Multiplexing) control.

The slave apparatus control signals for the individual slave apparatuses 7-1, 7-2, . . . , 7-n from the master apparatus 3 are transmitted through the control channel group 31 comprising the control channels 31-1, 31-2, . . . , 31-n corresponding to the individual slave apparatuses 7-1, 7-2, . . . , 7-n. The individual control channels 31-1, 31-2, . . . , 31-n are allotted to a plurality of time slots through TDM (time division multiplexing) so that the individual slave apparatus control signals are prevented from colliding with each other.

Likewise, the master apparatus control signals for the master apparatus 3 from the individual slave apparatuses 7-1, 7-2, . . . , 7-n are transmitted through the control channels 35-1, 35-2, . . . , 35-n corresponding to the slave apparatuses 7-1, 7-2, . . . , 7-n respectively. Since the individual control channels 35-1, 35-2, . . . , 35-n are allotted to a plurality of time slots, the individual master apparatus control signals are prevented from colliding with each other.

An information signal is transmitted to the master apparatus 3 only from a specific slave apparatus that has been selected by a slave apparatus control signal transmitted through the control channel group 31 of the master apparatus 3.

As explained above, in the digital data transmission system 1 in the first embodiment, which is constituted through the point-multipoint connection employing the 2-wire metallic transmission line 5, the slave apparatus control signals and the information signals transmitted from the master apparatus 3 and the master apparatus control signals and the information signals transmitted from the plurality of slave apparatuses 7-1, 7-2, . . . , 7-n are received by specific slave apparatuses and by the master apparatus 3 without colliding with each other, as in a system employing a 4-wire metallic transmission line in the prior art. In addition, since the 2-wire metallic transmission line 5 is employed, the cost required on the transmission line is greatly reduced compared to that required for a 4-wire metallic transmission line in the prior art. Furthermore, in place of the pulse transformers for transmission and the pulse transformers for reception required in the master apparatus 3 and the individual slave apparatuses 7-1, 7-2, . . . , 7-n in the 4-wire metallic transmission line in the prior art, pulse transformers 15 and 25 for both transmission and reception can be employed. Thus, the internal circuit structures of the master apparatus and the individual slave apparatuses are simplified to achieve the digital data transmission system 1 in the first embodiment through a compact component configuration, which, in turn, achieves a reduction in cost.

Second Embodiment

A digital data transmission system in the second embodiment of the present invention is practically identical in structure to the digital data transmission system 1 in the first embodiment described above.

Figure 3:
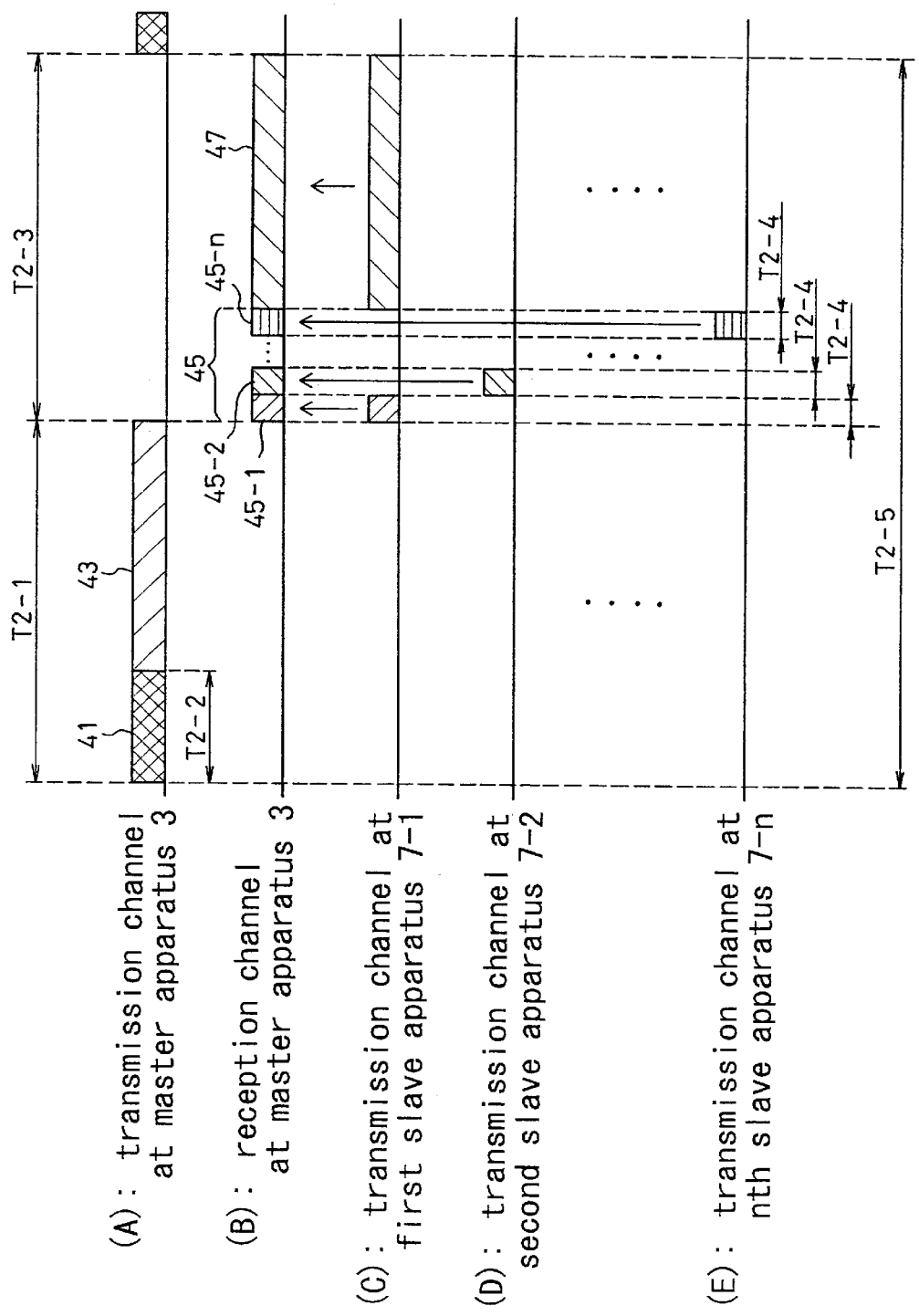
FIG. 3 is a timing chart illustrating the operation performed by the digital data transmission system in a second embodiment of the present invention.

FIG. 3 illustrates the operation performed by the digital data transmission system in the second embodiment. In FIG. 3, (A) illustrates the structure of a transmission channel in a master apparatus 3, through which a first slave apparatus 7-1, a second slave apparatus 7-2, . . . , a nth slave apparatus 7-n receive slave apparatus control signals and information signals. In FIG. 3, (B) illustrates the structure of a reception channel at the master apparatus 3. These reception channel is achieved by combining the individual transmission channels at all the slave apparatus, i.e., the first slave apparatus 7-1, the second slave apparatus 7-2, . . . , the nth slave apparatus 7-n. In addition, in FIG. 3, (C) illustrates the structure of the transmission channel at the first slave apparatus 7-1, (D) illustrates the structure of the transmission channel at the second slave apparatus 7-2, and (E) illustrates the structure of the transmission channel at the nth slave apparatus 7-n.

As illustrated at (A) in FIG. 3, the transmission channel at the master apparatus 3 comprise a control channel 41 for transmitting slave apparatus control signals for specific slave apparatuses and a data channel 43 for transmitting information signals to a specific one or two or more slave apparatuses selected through the control channel 41. Slave apparatus control signals transmitted through the control channel 41 of the master apparatus 3 include an apparatus ID number pre-allotted to each one or two or more apparatuses that constitute the destination of slave apparatus control signals being transmitted. In addition, the transmission of the slave apparatus control signals and the information signals is implemented during a time block T2-1.

As illustrated at (B) in FIG. 3, the master apparatus 3 receives master apparatus control signals from the individual slave apparatuses and information signals from specific slave apparatuses through its reception channel during a time block T2-3. The reception channel comprise a control channel group 45 constituted of n control channels 45-1, 45-2, . . . , 45-n for individually transmitting master apparatus control signals for the master apparatus 3 from the individual slave apparatuses and a data channel 47 for transmitting an information signal from a specific slave apparatus to the master apparatus 3. Only a slave apparatus that has been granted permission with a slave apparatus control signal transmitted from the master apparatus 3 is allowed to transmit an information signal to the master apparatus 3, and here, an explanation is given on an example in which such permission has been granted to the first slave apparatus 7-1, as illustrated in FIG. 3.

The individual control channels 45-1, 45-2, . . . , 45-n in the control channel group 45 are allotted to n time slots each having a time width of a time block T2-4. In addition, the control channels 45-1, 45-2, . . . , 45-n respectively correspond to the first slave apparatus 7-1, the second slave apparatus 7-2, . . . , the nth slave apparatus 7-n, and are allotted to the time slots at positions which correspond to the apparatus ID numbers pre-allotted to the individual slave apparatuses.

The data transmission between the master apparatus 3 and the individual slave apparatuses 7-1, 7-2, . . . , 7-n structured as described above is executed repeatedly over a cycle of time blocks T2-5 (=(time block (T2-1)+(time block T2-3)).

Next, the data transmission performed in the digital data transmission system in the second embodiment is explained in further detail.

First, the first slave apparatus 7-1, the second slave apparatus 7-2, . . . , the nth slave apparatus 7-n receive a slave apparatus control signal through the control channel 41 of the master apparatus 3.

One or two or more slave apparatuses selected with the apparatus ID numbers included in the slave apparatus control signal transmitted by the master apparatus 3, then receive an information signal through the data channel 43 in succession after the slave apparatus control signal.

After the information signal is received through the data channel 43 of the master apparatus 3, the first slave apparatus 7-1, the second slave apparatus 7-2, . . . , the nth slave apparatus 7-n transmit master apparatus control signals for the master apparatus 3 respectively through the control channels 45-1, 45-2, . . . , 45-n at time slot positions that correspond to the apparatus ID numbers pre-allotted to the individual slave apparatuses. The master apparatus 3 then receives the master apparatus control signals through the control channel group 45 comprising these control channels 45-1, 45-2, . . . , 45-n.

When the transmission of the master apparatus control signals is completed, a slave apparatus that has been granted permission to perform transmission of an information signal with a slave apparatus control signal from the master apparatus 3, e.g., the first slave apparatus 7-1, transmits an information signal to the master apparatus 3 through the data channel 47.

The transmission of the master apparatus control signals by the individual slave apparatuses 7-1, 7-2, . . . , 7-n through the control channels 45-1, 45-2, . . . , 45-n and the transmission of an information signal by the first slave apparatus that has been granted permission by the master apparatus 3 through the data channel 47 are completed within the time block T2-3.

As explained above, the data transmission from the master apparatus 3 to the individual slave apparatuses 7-1, 7-2, . . . , 7-n and the data transmission from the individual slave apparatuses 7-1, 7-2, . . . , 7-n to the master apparatus 3 are switched to change transmission directions over specific time intervals through TCM directional control.

In addition, a slave apparatus control signal for a specific slave apparatus from the master apparatus 3, which includes an apparatus ID number for specifying the particular slave apparatus, is communicated through the control channel 41.

The master apparatus control signals for the master apparatus 3 from the individual slave apparatuses 7-1, 7-2, . . . , 7-n are respectively transmitted through the control channels 45-1, 45-2, . . . , 45-n corresponding to the individual slave apparatuses 7-1, 7-2, . . . , 7-n. Since the individual control channels 45-1, 45-2, . . . , 45-n are allotted to a plurality of time slots, the individual slave apparatus control signals are prevented from colliding with each other.

An information signal is transmitted to the master apparatus 3 only from a specific slave apparatus that has been selected with a slave apparatus control signal transmitted through the control channel 41 of the master apparatus 3.

As explained above, in the digital data transmission system 1 in the second embodiment, which is constituted through the point-multipoint connection employing the 2-wire metallic transmission line 5, the slave apparatus control signals and the information signals transmitted from the master apparatus 3 and the master apparatus control signals and the information signals transmitted from the plurality of slave apparatuses 7-1, 7-2, . . . , 7-n are received by specific slave apparatuses and by the master apparatus 3 without colliding with each other, as in a system employing the 4-wire metallic transmission line in the prior art. In addition, since the 2-wire metallic transmission line 5 is employed, the cost required on the transmission line is greatly reduced compared to that required for a 4-wire metallic transmission line in the prior art. Furthermore, in place of the pulse transformers for transmission and the pulse transformers for reception required in the master apparatus 3 and the individual slave apparatuses 7-1, 7-2, . . . , 7-n in the 4-wire metallic transmission line in the prior art, the pulse transformers 15 and 25 for both transmission and reception can be employed. Thus, the internal circuit structures of the master apparatus and the individual slave apparatuses are simplified to achieve the digital data transmission system in the second embodiment through a compact component configuration, which, in turn, achieves a reduction in cost.

Moreover, in the digital data transmission system in the second embodiment, since a slave apparatus control signal is transmitted from the master apparatus 3 only for a specific slave apparatus, the length of time (time block T2-1) required for the transmission of a slave apparatus control signal and an information signal for a specific slave apparatus can be reduced compared to the length of time (time block T1-1) required in the digital data transmission system 1 in the first embodiment.

Third Embodiment

A digital data transmission system in the third embodiment of the present invention is practically identical in structure to the digital data transmission system 1 in the first embodiment described above.

Figure 4:
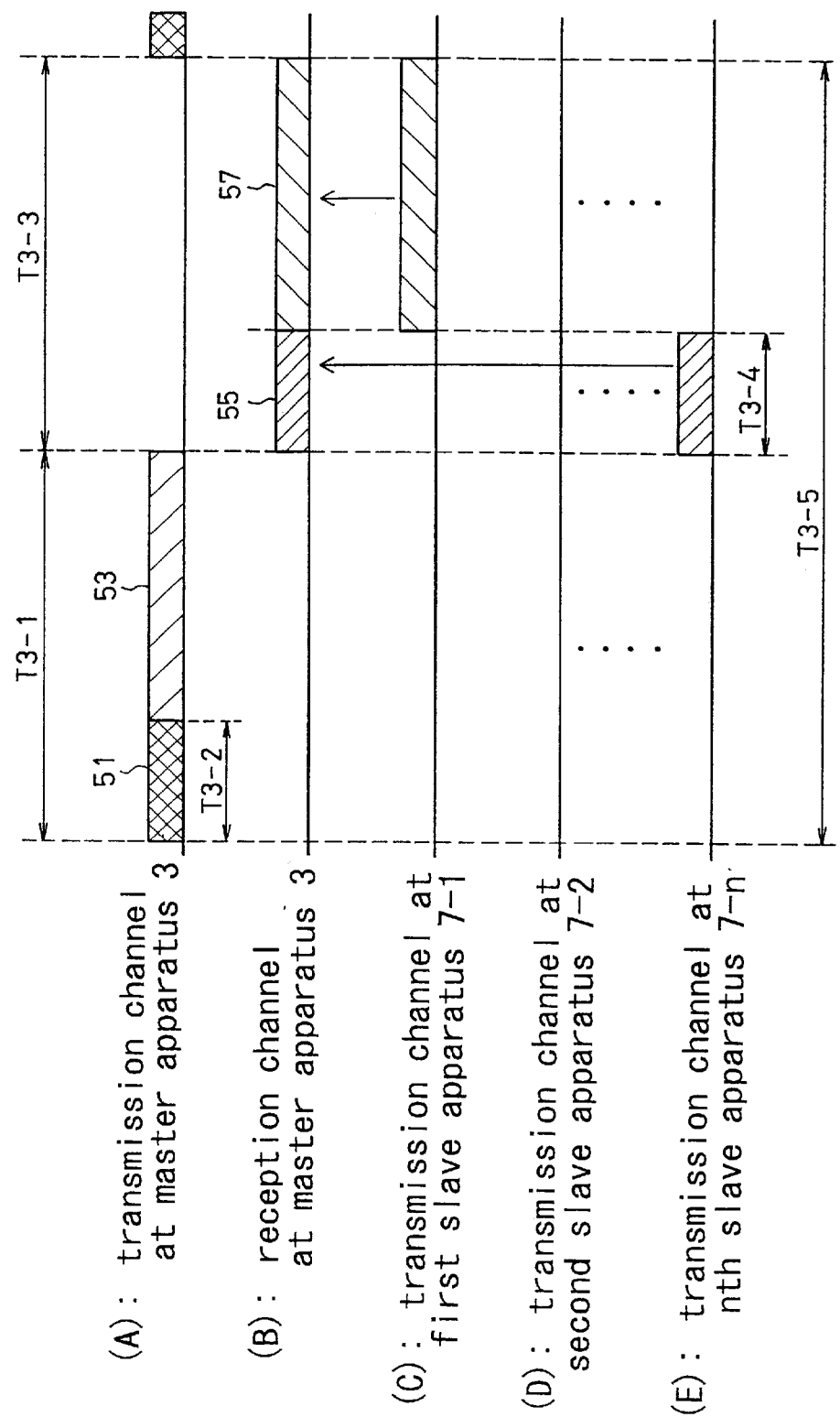
FIG. 4 is a timing chart illustrating the operation performed by the digital data transmission system in a third embodiment of the present invention.

FIG. 4 illustrates the operation performed by the digital data transmission system in the third embodiment. (A) in FIG. 4 illustrates the structure of a transmission channel in a master apparatus 3, through which the first slave apparatus 7-1, the second slave apparatus 7-2, . . . , the nth slave apparatus 7-n receive slave apparatus control signals and information signals. (B) in FIG. 4 illustrates the structure of a reception channel at the master apparatus 3. The reception channel is achieved by combining the individual transmission channels of all the slave apparatus, i.e., the first slave apparatus 7-1, the second slave apparatus 7-2, . . . , the nth slave apparatus 7-n. In addition, (C) in FIG. 4 illustrates the structure of the transmission channel at the first slave apparatus 7-1, (D) illustrates the structure of the transmission channel at the second slave apparatus 7-2, and (E) illustrates the structure of a transmission channel at the nth slave apparatus 7-n.

As illustrated at (A) in FIG. 4, the transmission channel at the master apparatus 3 comprises a control channel 51 for transmitting slave apparatus control signals for specific slave apparatuses and a data channel 53 for transmitting information signals to a specific one or two or more slave apparatuses selected through the control channel 51. Slave apparatus control signals transmitted through the control channel 51 of the master apparatus 3 each include an apparatus ID number pre-allotted to one or two or more apparatuses that constitute the destination of slave apparatus control signals being transmitted. In addition, the transmission of the slave apparatus control signals and the information signals is implemented during a time block T3-1.

As illustrated at (B) in FIG. 4, the master apparatus 3 receives master apparatus control signals and information signals from the individual slave apparatuses through its reception channel during a time block T3-3. The reception channel comprises a control channel 55 for transmitting a master apparatus control signal for the master apparatus 3 from a specific slave apparatus and a data channel 57 for transmitting an information channel for the master apparatus 3 from a specific slave apparatus. The master apparatus control signal transmitted through the control channel 55 includes the apparatus ID number of the slave apparatus which is the origin of the master apparatus control signal being transmitted, e.g., the apparatus ID number of the nth slave apparatus 7-n in this example. Only a slave apparatus that has been granted permission with a slave apparatus control signal transmitted from the master apparatus 3 is allowed to transmit an information signal to the master apparatus 3, and here, an explanation is given on an example in which such permission has been granted to the first slave apparatus 7-1, as illustrated in FIG. 4.

The data transmission between the master apparatus 3 and the individual slave apparatuses 7-1, 7-2, . . . , 7-n structured as described above is executed repeatedly over a cycle of time blocks T3-5 (=(time block T3-1)+(time block T3-3)).

Next, the data transmission performed in the digital data transmission system in the third embodiment is explained in further detail.

First, the first slave apparatus 7-1, the second slave apparatus 7-2, . . . , the nth slave apparatus 7-n receive a slave apparatus control signal through the control channel 51 of the master apparatus 3.

One or two or more slave apparatuses selected with the apparatus ID number included in the slave apparatus control signal transmitted by the master apparatus 3, then receive an information signal through the data channel 53 in succession after the slave apparatus control signal.

After a specific slave apparatus (the nth apparatus 7-n in this example) selected with a slave apparatus control signal from the master apparatus 3 receives an information signal through the data channel 53 of the master apparatus 3, it transmits a master apparatus control signal containing its apparatus ID number to the master apparatus 3 through the control channel 55. The master apparatus 3 then receives the master apparatus control signal from the nth slave apparatus 7-n.

When the transmission of the master apparatus control signal is completed, a slave apparatus that has been granted permission to perform transmission of an information signal with a slave apparatus control signal from the master apparatus 3, e.g., the first slave apparatus 7-1, transmits an information signal to the master apparatus 3 through the data channel 57.

The transmission of the master apparatus control signal by the nth slave apparatus 7-n through the control channels 55 and the transmission of the information signal by the first slave apparatus that has been granted permission by the master apparatus 3 through the data channel 57 are completed within the time block T3-3.

As explained above, the data transmission from the master apparatus 3 to the individual slave apparatuses 7-1, 7-2, . . . , 7-n and the data transmission from the individual slave apparatuses 7-1, 7-2, . . . , 7-n to the master apparatus 3 are switched to change transmission direction over specific time intervals through TCM directional control.

In addition, a slave apparatus control signal for a specific slave apparatus from the master apparatus 3, which includes the apparatus ID number for specifying the particular slave apparatus, is communicated through the control channel 51.

Only a specific slave apparatus selected with a slave apparatus control signal transmitted through the control channel 51 of the master apparatus 3 transmits a master apparatus control signal for the master apparatus 3 among the slave apparatuses 7-1, 7-2, . . . , 7-n. In addition, the master apparatus control signal contains the apparatus ID number of the specific slave apparatus that is the origin of the transmission.

Likewise, only a specific slave apparatus that has been selected by a slave apparatus control signal transmitted through the control channel 51 of the master apparatus 3 among the slave apparatuses 7-1, 7-2, . . . , 7-n transmits an information signal for the master apparatus 3.

As explained above, in the digital data transmission system in the third embodiment, which is constituted through the point-multipoint connection employing the 2-wire metallic transmission line 5, the slave apparatus control signals and the information signals transmitted from the master apparatus 3 and the master apparatus control signals and the information signals transmitted from the plurality of slave apparatuses 7-1, 7-2, . . . , 7-n are received by specific slave apparatuses and by the master apparatus 3 without colliding with each other, as in a system employing the 4-wire metallic transmission line in the prior art. In addition, since the 2-wire metallic transmission line 5 is employed, the cost required on the transmission line is greatly reduced compared to that required for a 4-wire metallic transmission line in the prior art. Furthermore, in place of the pulse transformers for transmission and the pulse transformers for reception required in the master apparatus 3 and the individual slave apparatuses 7-1, 7-2, . . . , 7-n in the 4-wire metallic transmission line in the prior art, the pulse transformers 15 and 25 for both transmission and reception can be employed. Thus, the internal circuit structures of the master apparatus and the individual slave apparatuses are simplified to achieve the digital data transmission system in the third embodiment through a compact component configuration, which, in turn, achieves a reduction in cost.

Furthermore, in the digital data transmission system in the third embodiment, since a slave apparatus control signal is transmitted from the master apparatus 3 only for a specific slave apparatus, as in the digital data transmission system in the second embodiment, the length of time (time block T3-1) required for the transmission of a slave apparatus control signal and an information signal for a specific slave apparatus can be reduced compared to the length of time (time block T1-1) required in the digital data transmission system 1 in the first embodiment.

Since master apparatus control signals are transmitted to the master apparatus 3 only from specific slave apparatuses in the digital data transmission system in the third embodiment, the length of time (time block T3-3) required for the transmission of the master apparatus control signals and the information signals from the specific slave apparatuses to the master apparatus 3 can be reduced compared to that required in the digital data transmission systems in the first and second embodiments (time blocks T1-3, T2-3). Moreover, since no time slots are used in the transmission of the master apparatus control signals and the slave apparatus control signals, additional slave apparatuses can be provided with ease.

Fourth Embodiment

Figure 5:
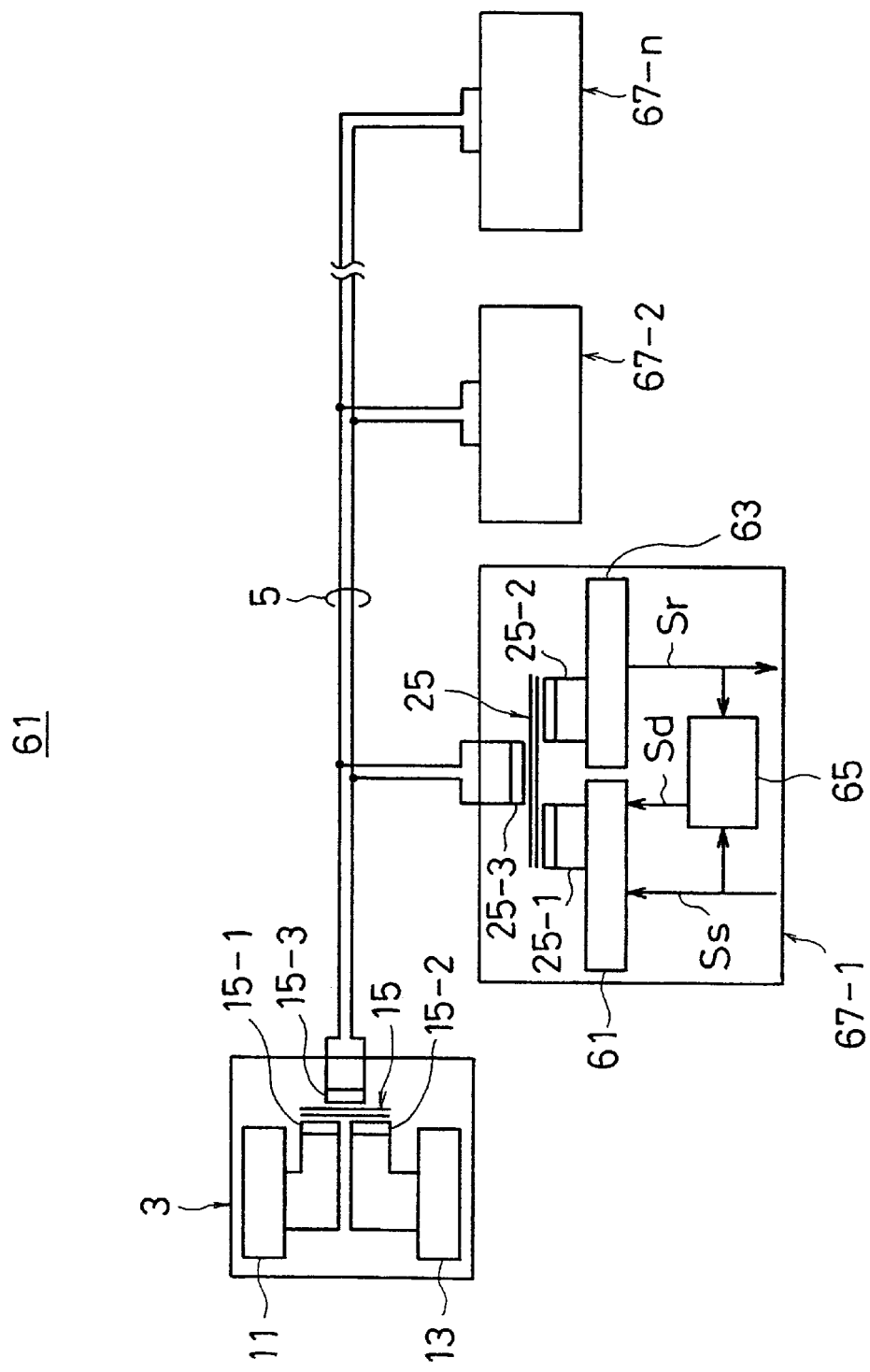
FIG. 5 is a block diagram illustrating the structure of the digital data transmission system in a fourth embodiment of the present invention.

FIG. 5 illustrates the structure of a digital data transmission system 61 in the fourth embodiment of the present invention. This digital data transmission system 61 is constituted by replacing the first slave apparatus 7-1, the second slave apparatus 7-2, . . . , the nth slave apparatus 7-n in the digital data transmission system 1 in the first embodiment with a first slave apparatus 67-1, a second slave apparatus 67-2, . . . , an nth slave apparatus 67-n respectively. It is to be noted that other components are practically identical to those in the first embodiment.

Continuous apparatus ID numbers are set in advance for the n slave apparatuses, i.e. , the first slave apparatus 67-1, the second slave apparatus 67-2, . . . , the nth slave apparatus 67-n. In addition, the input/output portions of the individual slave apparatuses have structural features that are practically identical to one another, and thus, the structure of the first slave apparatus 67-1 is explained here as a typical example.

The first slave apparatus 67-1 assumes a structure achieved by replacing the transmission circuit 21 and the reception circuit 23 in the first slave apparatus 7-1 provided in the digital data transmission system 1 in the first embodiment with a transmission circuit 61 and a reception circuit 63 respectively and by adding a data detection circuit 65.

The transmission circuit 61 is connected to the first winding 25-1 of the pulse transformer 25 whereas the reception circuit 63 is connected to the second winding 25-2 of the pulse transformer 25. In addition, the data detection circuit 65 assumes a structure that allows a transmission signal Ss which is transmitted from the internal circuit (not shown) of the first slave apparatus 67-1 to the outside of the apparatus via the transmission circuit 61 and the pulse transformer 25 and a reception signal Sr which is transmitted from the outside of the apparatus to the internal circuit via the pulse transformer 25 and the reception circuit 63 to be input. The data detection circuit 65 has the function of comparing the transmission signal Ss and the reception signal Sr and outputting the results of the comparison to the transmission circuit 61 as a detection signal Sd.

The operation performed by the digital data transmission system 61 in the fourth embodiment structured as described above is now explained in reference to FIGS. 6 and 7.

(A) in FIG. 6 illustrates the structure of a transmission channel in the master apparatus 3, through which the first slave apparatus 67-1, the second slave apparatus 67-2, . . . , the nth slave apparatus 67-n receive slave apparatus control signals and information signals. (B) in FIG. 6 illustrates the structure of a reception channel at the master apparatus 3. This reception channel is achieved by combining the individual transmission channels of all the slave apparatus, i.e., the first slave apparatus 67-1, the second slave apparatus 67-2, . . . , the nth slave apparatus 67-n. In addition, (C) in FIG. 6 illustrates the structure of the transmission channel at the first slave apparatus 67-1, (D) illustrates the structure of the transmission channel at the second slave apparatus 67-2, and (E) illustrates the structure of the transmission channel at the nth slave apparatus 67-n.

As illustrated at (A) in FIG. 6, the transmission channel at the master apparatus 3 comprises a control channel 71 for transmitting slave apparatus control signals for specific slave apparatuses and a data channel 73 for transmitting information signals to a specific one or two or more slave apparatuses selected through the control channel 71. The slave apparatus control signals transmitted through the control channel 71 of the master apparatus 3 each include an apparatus ID number pre-allotted to one or two or more slave apparatuses that constitute the destination of the slave apparatus control signals being transmitted. In addition, the transmission of the slave apparatus control signals and the information signals is implemented during a time block T4-1.

As illustrated at (B) in FIG. 6, the master apparatus 3 receives master apparatus control signals and information signals from specific slave apparatuses through the reception channel during a time block T4-3. The reception channel comprises a control channel 75 for transmitting master apparatus control signals for the master apparatus 3 from specific slave apparatuses and a data channel 77 for transmitting an information signal for the master apparatus 3 from a specific slave apparatus. Only a slave apparatus that has been granted permission with a slave apparatus control signal transmitted from the master apparatus 3 is allowed to transmit an information signal to the master apparatus 3, and here, an explanation is given on an example in which such permission has been granted to the first slave apparatus 67-1, as illustrated in FIG. 6.

The control channel 75 in the reception channels at the master apparatus 3 illustrated at(B) in FIG. 6 is achieved by combining control channels 69-1, 69-2, . . . , 69-n through which signals from the individual slave apparatuses 67-1, 67-2, . . . , 67-n are transmitted, and its details are explained later.

The data transmission between the master apparatus 3 and the individual slave apparatuses 67-1, 67-2, . . . , 67-n structured as described above is executed repeatedly over a cycle of time blocks T4-5 (=time block (T4-1)+(time block T4-3)).

Next, the data transmission performed in the digital data transmission system 61 in the fourth embodiment is explained in further detail.

First, the first slave apparatus 67-1, the second slave apparatus 67-2, . . . , the nth slave apparatus 67-n receive slave apparatus control signals through the control channel 71 of the master apparatus 3.

One or two or more slave apparatuses that have been selected with the apparatus ID numbers included in the slave apparatus control signals transmitted by the master apparatus 3 then receive information signals through the data channel 73 in succession after the slave apparatus control signal.

After the information signals are received through the data channel 73 of the master apparatus 3, the individual slave apparatuses 67-1, 67-2, . . . , 67-n transmit master apparatus control signals containing apparatus ID numbers pre-allotted to the individual slave apparatuses to the master apparatus 3 through the control channels 69-1, 69-2, . . . , 69-n. Then, the master apparatus 3 receives the master apparatus control signals through the control channel 75 achieved by combining the control channels 69-1, 69-2, . . . , 69-n.

When the transmission of the master apparatus control signals is completed, a slave apparatus that has been granted permission to perform transmission of an information signal with a slave apparatus control signal from the master apparatus 3, e.g., the first slave apparatus 67-1, transmits an information signal to the master apparatus 3 through the data channel 77.

The transmission of the master apparatus control signals by the individual slave apparatuses 67-1, 67-2, . . . , 67-n through the control channels 69-1, 69-2, . . . , 69-n and the transmission of the information signal by the first specific slave apparatus that has been granted permission by the master apparatus 3 through the data channel 77 are completed within the time block T4-3.

Now, when the individual slave apparatuses 67-1, 67-2, . . . , 67-n transmit master apparatus control signals through the control channels 69-1, 69-2, . . . , 69-n, the slave apparatuses 67-1, 67-2, . . . , 67-n operate as described below in order to prevent the master apparatus control signals from colliding with one another on the 2-wire metallic transmission line 5.

The explanation here is given on the operation of the individual slave apparatuses 67-1, 67-2, . . . , 67-n implemented to prevent data collision in reference to FIG. 7.

FIG. 7, (a), (b), (c), (d), (e), (f) and (g) are timing charts of various signals present in the digital data transmission system 61 during a time block T4-4. FIG. 7(*a*) illustrates the timing of the master apparatus control signal in the 2-wire metallic transmission line 5. FIG. 7(*b*) illustrates the timing of the transmission signal Ss inside the first slave apparatus 67-1 and FIG. 7(*c*) illustrates the timing of the reception signal Sr. in the first slave apparatus 67-1 FIG. 7(*d*) illustrates the timing of the transmission signal Ss in the second slave apparatus 67-2 and FIG. 7(*e*) illustrates the timing of the reception signal Sr in the second slave apparatus 67-2. FIG. 7(*f*) illustrates the timing of the transmission signal Ss in the nth slave apparatus 67-n and FIG. 7(*g*) illustrates the timing of the reception signal Sr in the second slave apparatus 67-n.

The master apparatus control signals transmitted from the individual slave apparatuses 67-1, 67-2, 67-n through the control channels 69-1, 69-2, . . . , 69-n respectively undergo framing processing such as HDLC framing. In addition, data "0" in a master apparatus control signal correspond to the transmission signal Ss in an active state whereas data "1" correspond to the transmission signal Ss in an inactive state. Consequently, the state in which the data "1" are continuous in a master apparatus control signal that is being transmitted is equivalent to a state in which the output of the transmission signal Ss is stopped. It is to be noted that since the HDLC procedures are adopted in the digital data transmission system 61 in the fourth embodiment, the data "1" are never present in the information being transmitted in a succession of 7 sets or more.

Now, an explanation is given on an example in which the first slave apparatus 67-1 transmits a master apparatus control signal for the master apparatus 3 through the control channel 69-1.

The data detection circuit 65 provided in the first slave apparatus 67-1 monitors the reception signal Sr which is input via the pulse transformer 25 and the reception circuit 63 during the time block T4-4. By monitoring the reception signal Sr, the state of the master apparatus control signal being transmitted on the 2-wire metallic transmission line 5 is detected. Then, at a point in time at which the data "1" are detected in the reception signal Sr continuously in a succession of 8 sets or more, the data detection circuit 65 determines that no master apparatus control signal is being transmitted from any of the other slave apparatuses 67-2, . . . , 67-n. Now, since the data "1" are never continuous over 7 sets or more in data transmission employing the HDLC procedures as explained earlier, data transmission may be determined to have been stopped upon the detection of seven or more consecutive sets of data "1". However, in this embodiment, a leeway of one bit is given and a criterion for the decision-making is 8 continuous sets of the data "1".

The data detection circuit 65 that has determined that no master apparatus control signal is being transmitted on the 2-wire metallic transmission line 5 then outputs a detection signal Sd to the transmission circuit 61. Upon receiving the detection signal Sd, the transmission circuit 61 transmits a master apparatus control signal based upon the transmission signal Ss to the 2-wire metallic transmission line 5 via the pulse transformer 25. The master apparatus 3 then receives the master apparatus control signal through the control channel 69-1 of the first slave apparatus 67-1.

While the explanation has been given so far on the example in which the first slave apparatus 67-1 transmits a master apparatus control signal via its control channel 69-1, the other slave apparatuses, i.e., the second slave apparatus 67-2, ..., the nth slave apparatus 67-n, too, are each capable of detecting the presence/absence of a master apparatus control signal on the 2-wire metallic transmission line 5 and transmitting a master apparatus control signal through their control channels 69-2, 69-n respectively if it is decided that no master apparatus control signal is present.

Next, the operation during which the first slave apparatus 67-1, for instance, transmits a master apparatus control signal through the control channel 69-1 is explained.

From the point in time at which the transmission of the master apparatus control signal starts, the data detection circuit 65 provided in the first slave apparatus 67-1 compares the data indicated by the transmission signal Ss and the data indicated by the reception signal Sr. Consequently, if their data match, the data detection circuit 65 outputs a detection signal Sd to prompt the transmission circuit 61 to sustain the transmission of the master apparatus control signal. If, on the other hand, the data do not match, the data detection circuit 65 again outputs a detection signal Sd to prompt the transmission circuit 61 to stop the transmission of the master apparatus control signal. Likewise, when a master apparatus control signal is transmitted by any of the second slave apparatuses 67-2, ..., the nth slave apparatus 67-n, its data detection circuit 65 detects data of a master apparatus control signal transmitted by another slave apparatus, to make a decision as to whether or not the transmission of the master apparatus control signal is to be sustained.

The following is an explanation of a specific operation performed when a plurality of slave apparatuses have started transmission through the control channels and they compete, in reference to FIG. 7. It is to be noted that the explanation here is given on an example in which the first slave apparatus 67-1, the second slave apparatus 67-2 and the nth slave apparatus 67-n have simultaneously started transmitting a master apparatus control signal constituted of data "011 . . . ", a master apparatus control signal constituted of data "01000110" and a master apparatus control signal constituted of data "01001 . . . " respectively.

The first bits of the transmission signals Ss transmitted by the individual slave apparatuses 67-1, 67-2, ..., 67-n are all set to data "0" as shown at (b), (d) and (f) in FIG. 7, and consequently, the first bit of the master apparatus control signal in the 2-wire metallic transmission line 5 shown at (a) in FIG. 7 indicates data "0" achieved by combining the data "0" in the individual transmission signals Ss.

The reception circuit 63 of the first slave apparatus 67-1 receives the first bit data "0" in the master apparatus control signal in the 2-wire metallic transmission line 5 and outputs a reception signal Sr. The data detection circuit 65 compares the first bit data "0" in the reception signal Sr output from the reception circuit 63 and the first bit data "0" in the transmission signal Ss input to the transmission circuit 61. Then, with the data determined to be matching, it prompts the transmission circuit 61 to sustain the transmission of the master apparatus control signal based upon the transmission signal Ss.

Likewise, the data detection circuits provided at the second slave apparatus 67-2 and the nth slave apparatus 67-n detect that the first bit data "0" in their respective transmission signals Ss and reception signals Sr match as illustrated at (d) and (e) in FIG. 7 and at (f) and (g) in FIG. 7, and prompt their transmission circuits 61 to sustain the transmission of the master apparatus control signals based upon the respective transmission signals Ss.

The second bits of the transmission signals Ss transmitted by the individual slave apparatuses 67-1, 67-2, and 67-n are all set to data "1" as shown at (b), (d) and (f) in FIG. 7, and consequently, the second bit of the master apparatus control signal in the 2-wire metallic transmission line 5 shown at (a) in FIG. 7 indicates data "1" achieved by combining the data "1" in the individual transmission signals Ss.

The reception circuit 63 of the first slave apparatus 67-1 receives the second bit data "1" in the master apparatus control signal in the 2-wire metallic transmission line 5 and outputs a reception signal Sr. The data detection circuit 65 at the first slave apparatus 67-1 compares the second bit data "1" in the reception signal Sr output from the reception circuit 63 and the second bit data "1" in the transmission signal Ss input to the transmission circuit 61. Then, with the data determined to be matching, it prompts the transmission circuit 61 to sustain the transmission of the master apparatus control signal based upon the transmission signal Ss.

Likewise, the data detection circuits provided at the second slave apparatus 67-2 and the nth slave apparatus 67-n detect that the second bit data "1" in their respective transmission signals Ss and reception signals Sr match as illustrated at (d) and (e) in FIG. 7 and at (f) and (g) in FIG. 7, and prompt their transmission circuits 61 to sustain the transmission of the master apparatus control signals based upon the respective transmission signals Ss.

The third bit in the transmission signal Ss transmitted by the first slave apparatus 67-1 indicates data "1" as shown at (b) in FIG. 7 and the third bits in the transmission signals Ss transmitted by the second and nth slave apparatuses 67-2 and 67-n indicate data "0" as shown at (d) and (f) in FIG. 7. As a result, the third bit in the master apparatus control signal in the 2-wire metallic transmission line 5 shown at (a) in FIG. 7 indicates data "0" achieved by combining the data "1" and the data "0" in the individual transmission signals Ss.

The reception circuit 63 of the first slave apparatus 67-1 receives the third bit data "0" in the master apparatus control signal in the 2-wire metallic transmission line 5 and outputs a reception signal Sr. The data detection circuit 65 of the first slave apparatus 67-1 compares the third bit data "0" in the reception signal Sr output from the reception circuit 63 and the third bit data "1" in the transmission signal Ss input to the transmission circuit 61. It then detects a data non-match, i.e., a data collision in the 2-wire metallic transmission line 5, and prompts the transmission circuit 61 to stop the transmission of the master apparatus control signal based upon the transmission signal Ss. Subsequently, the first slave apparatus 67-1 sustains a master apparatus control signal transmission stopped state based upon its decision that one of the other slave apparatuses is transmitting a master apparatus control signal, until a master apparatus control signal can next be transmitted through the control channel 69-1, i.e., until the data detection circuit 65 detects a reception signal Sr containing 8 successive sets of data "1" during the time block T4-4 in FIG. 6.

The data detection circuits provided at the second slave apparatus 67-2 and the nth slave apparatus 67-n, on the other hand, detect that the third bit data "0" in their respective transmission signals Ss and the reception signals Sr match as illustrated at (d) and (e) in FIG. 7 and at (f) and (g) in FIG. 7, and prompt their transmission circuits 61 to sustain the transmission of the master apparatus control signals based upon there respective transmission signals Ss.

Since the fourth bit in the transmission signals Ss transmitted by the second and nth slave apparatuses 67-2 and 67-n indicate data "0" as shown at (d) and (f) in FIG. 7, the fourth bit in the master apparatus control signal in the 2-wire metallic transmission line 5 shown at (a) in FIG. 7 indicates data "0" achieved by combining the data "0" in the individual transmission signals Ss.

The data detection circuits provided at the second slave apparatus 67-2 and the nth slave apparatus 67-n detect that the fourth bit data "0" in their respective transmission signals Ss and the reception signals Sr match as illustrated at (d) and (e) in FIG. 7 and at (f) and (g) in FIG. 7, and prompt their transmission circuits 61 to sustain the transmission of the master apparatus control signals based upon their respective transmission signals Ss.

The fifth bit in the transmission signal Ss transmitted by the nth slave apparatus 67-n indicates data "1" as shown at (f) in FIG. 7 whereas the fifth bit in the transmission signal Ss transmitted by the second slave apparatus 67-2 indicates data "0" as shown at (d) in FIG. 7. Consequently, the fifth bit in the master apparatus control signal in the 2-wire metallic transmission line 5 shown at (a) in FIG. 7 indicates data "0" achieved by combining the data "1" and the data "0" in the individual transmission signals Ss.

The reception circuit 63 of the nth slave apparatus 67-n receives the fifth bit data "0" in the master apparatus control signal in the 2-wire metallic transmission line 5 and outputs a reception signal Sr. The data detection circuit 65 of the nth slave apparatus 67-n compares the fifth bit data "0" in the reception signal Sr output from the reception circuit 63 and the fifth bit data "1" in the transmission signal Ss input to the transmission circuit 61. It then detects data non-match, i.e., data collision in the 2-wire metallic transmission line 5, and prompts the transmission circuit 61 to stop the transmission of the master apparatus control signal based upon the transmission signal Ss. Subsequently, the nth slave apparatus 67-n sustains a master apparatus control signal transmission stopped state based upon its decision that one of the other slave apparatuses is transmitting a master apparatus control signal, until the next master apparatus control signal can be transmitted through the control channel 69-n, i.e., until the data detection circuit 65 detects a reception signal Sr containing 8 successive sets of data "1" during the time block T4-4 in FIG. 6.

The data detection circuit 65 provided at the second slave apparatus 67-2, on the other hand, detects that the fifth bit data "0" in the transmission signal Ss and the reception signal Sr match, as illustrated at (d) and (e) in FIG. 7, and prompts the transmission circuit 61 to sustain the transmission of the master apparatus control signals based upon the transmission signal Ss.

Thus, ultimately, the second slave apparatus 67-2 alone sustains the transmission of the master apparatus control signal based upon the sixth bit and subsequent bits of the transmission signal Ss, and as a result, the master apparatus control signal is transmitted to the master apparatus 3 through the control channel 69-2 of the second slave apparatus 67-2.

Then, as illustrated in FIG. 6, when the transmission of the master apparatus control signal through the control channel 69-2 of the second slave apparatus 67-2 is completed, a slave apparatus selected by a slave apparatus control signal transmitted through the control channel 71 of the master apparatus 3, e.g., the first slave apparatus 67-1, transmits an information signal to the master apparatus 3 through the data channel 77. It is to be noted that the transmission of the master apparatus control signal by the second slave apparatus 67-2 and the transmission of the information signal by the first slave apparatus 67-1 are completed within the time block T4-5.

As explained above, the slave apparatuses each make a decision as to whether or not there is a master apparatus control signal being transmitted in the 2-wire metallic transmission line 5 by counting eight consecutive sets of data "1", on a counter or the like for detection during the time block T4-4. Then, when the transmission of a master apparatus control signal is completed by a given slave apparatus, e.g., by the second slave apparatus 67-2 as illustrated in FIG. 7, the second slave apparatus 67-2 changes the counter data from "8" to "9" so that it can be decided that no master apparatus control signal is being transmitted in the 2-wire metallic transmission line 5 only when nine consecutive sets of "1" are detected during the next transmission of a master apparatus control signal through the control channel 69-2, i.e., during the time block T4-4 in FIG. 6.

Thus, opportunities for master apparatus control signal transmission are offered equally to all the other slave apparatuses, without allowing the second slave apparatus 67-2 to continue with the transmission of the master apparatus control signal. When a slave apparatus with its counter data set to "9" completes another master apparatus control signal transmission, its counter data are reset to "10".

In addition, when a master apparatus control signal transmission by one slave apparatus with its counter data set to "9" and a master apparatus control signal transmission by another slave apparatus compete in the 2-wire metallic transmission line 5 and the master apparatus control signal transmission by the aforementioned one slave apparatus is stopped as in the case with the first slave apparatus 67-1 and the nth slave apparatus 67-n in FIG. 7, its counter data are then reset to "8" from "9". With this, the slave apparatus whose master apparatus control signal transmission has been stopped will have priority over the slave apparatus that has completed a transmission, in regard to the next master apparatus control signal transmission. In other words, by increasing/reducing the counter data on the counter that counts the data "1" in a master apparatus control signal, depending upon whether or not the transmission of the master apparatus control signal has been completed, all the slave apparatuses will be given equal opportunity for master apparatus control signal transmission.

As explained above, in the digital data transmission system 61 in the fourth embodiment, which is constituted through the point-multipoint connection employing the 2-wire metallic transmission line 5, the slave apparatus control signals and the information signals transmitted from the master apparatus 3 and the master apparatus control signals and the information signals transmitted from the plurality of slave apparatuses 67-1, 67-2, . . . , 67-n are received by specific slave apparatuses and by the master apparatus 3 without colliding with each other, as in a system employing the 4-wire metallic transmission line in the prior art. In addition, since the 2-wire metallic transmission line 5 is employed, the cost required on the transmission line is greatly reduced compared to that required for a 4-wire metallic transmission line in the prior art. Furthermore, in place of the pulse transformers for transmission and the pulse transformers for reception required in the master apparatus 3 and the individual slave apparatuses 67-1, 67-2, . . . , 67-n in the 4-wire metallic transmission line in the prior art, the pulse transformers 15 and 25 for both transmission and reception can be employed. Thus, the internal circuit structures of the master apparatus and the individual slave apparatuses are simplified to achieve the digital data transmission system 61 in the fourth embodiment through a compact component configuration, which, in turn, achieves a reduction in cost.

In addition, in the digital data transmission system 61 in the fourth embodiment, which is provided with the data detection circuit 65 at each of the slave apparatuses, a control signal can be transmitted after verifying that no control signal is being transmitted through the 2-wire metallic transmission line. Thus, the data transmitted from the individual slave apparatuses through their control channels are prevented from colliding with one another to achieve efficient control signal transmission.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, in the digital data transmission system 61 in the fourth embodiment, the criteria for making a decision in regard to the presence/absence of a master apparatus control signal in the 2-wire metallic transmission line 5 with the data detection circuits provided at the individual slave apparatuses, i.e., the data "1" count value, may vary among the individual slave apparatuses. This will set varying degrees of communication priority for a plurality of slave apparatuses and, consequently, a slave apparatus with a high degree of priority can be allocated to a user with a high communication frequency, for instance, to realize an even more efficient communication environment.

As have been explained, according to the present invention, a data transmission system which is constituted by adopting the point-multipoint connection through a 2-wire metallic transmission line and is still capable of transmitting data transmitted by the master apparatus and data transmitted by a plurality of slave apparatuses to specific slave apparatuses and to the master apparatus without allowing them to collide with one another, is provided.

The entire disclosure of Japanese Patent Application No. 10-200476 filed on Jul. 15, 1998 including specification, claims, drawings and summary is incorporated herein by reference on its entirety.

What is claimed is:

1. A data transmission system comprising:
   a master apparatus;
   a plurality of slave apparatuses, each comprising:
      a data detection circuit that monitors transmission line data being transmitted in a transmission line connecting said master apparatus and said slave apparatuses; and
      a data transmission circuit; and
   a point-to-multi-point connection connecting said master apparatus to said slave apparatuses, wherein:
      said data detection circuit provided at each of said slave apparatuses counts a number of continuous codes indicating a specific logic level in said transmission line data that said data detection circuit monitors and prompts said data transmission circuit provided at each of said slave apparatuses to start transmission of transmission data when said number of continuous codes has reached a count value set for said detection circuit, and
      said count value increases for a given slave apparatus when transmission of transmission data by said slave apparatus is completed.

2. A data transmission system according to claim 1, wherein:
   said master apparatus transmits data to said plurality of slave apparatuses during one time block; and
   said plurality of slave apparatuses transmit data to said master apparatus during another time block.

3. A data transmission system according to claim 2, wherein:
   said first time block includes a first time sub-block and a second time sub-block; and
   said master apparatus transmits a slave apparatus control signal for controlling one or two or more of said slave apparatuses during said first time sub-block and transmits an information signal for providing specific information for said one or two or more slave apparatuses during said second time sub-block.

4. A data transmission system according to claim 3, wherein:
   an apparatus ID number is set for each of said slave apparatuses; and
   said slave apparatus control signal transmitted by said master apparatus includes said apparatus ID number.

5. A data transmission system according to claim 3, wherein:
   time slots corresponding to said slave apparatuses are set in said first time sub-block.

6. A data transmission system according to claim 2, wherein:
   said second time block includes a third time sub-block and a fourth time sub-block;
   at least one of said plurality of slave apparatuses transmits a master apparatus control signal for controlling said master apparatus during said third time sub-block; and
   at least one of said plurality of slave apparatuses transmits an information signal for providing said master apparatus with specific information during said fourth time sub-block.

7. A data transmission system according to claim 6, wherein:
   time slots corresponding to said slave apparatuses are set in said third time sub-block.

8. A data transmission system according to claim 1, wherein:
   said master apparatus transmits data to said plurality of slave apparatuses during a first time block;
   said plurality of slave apparatuses transmit data to said master apparatus during a second time block, said second time block including a first time sub-block and a second time sub-block; and
   at least one of said plurality of slave apparatuses transmits a master apparatus control signal for controlling said master apparatus during said first time sub-block and at least one of said plurality of slave apparatuses transmits an information signal for providing said master apparatus with specific in formation during said second time sub-block.

9. A data transmission system according to claim 8, wherein:
   time slots corresponding to said slave apparatuses are set in said first time sub-block.

10. A data transmission system according to claim 8, wherein:
   said first time block includes a third time sub-block and a fourth time sub-block; and
   said master apparatus transmits a slave apparatus control signal for controlling one or two or more of said slave apparatuses during said third time sub-block and transmits an information signal for providing specific information for said one or two or more slave apparatuses during said fourth time sub-block.

11. A data transmission system according to claim 10, wherein:
   an apparatus ID number is set for each of said slave apparatuses; and
   said slave apparatus control signal transmitted by said master apparatus includes said apparatus ID number.

12. A data transmission system according to claim 10, wherein:
   time slots corresponding to said slave apparatuses are set in said third time sub-block.

13. A data transmission system according to claim 1, wherein transmission of information on said transmission line is done according to the High-Level Data Link Control protocol.

14. A data transmission system comprising:
   a master apparatus;
   a plurality of slave apparatuses, each comprising:
      a data detection circuit that monitors transmission line data being transmitted in a transmission line connecting said master apparatus and said slave apparatuses; and
      a data transmission circuit; and
   a point-to-multi-point connection connecting said master apparatus to said slave apparatuses, wherein:
      said data detection circuit provided at each of said slave apparatuses counts a number of continuous codes indicating a specific logic level in said transmission line data that said data detection circuit monitors and prompts said data transmission circuit provided at each of said slave apparatuses to start transmission of transmission data when said number of continuous codes has reached a count value set for said detection circuit, and
      said data detection circuit provided at each of said slave apparatuses compares transmission data transmitted by said slave apparatus and said transmission line data and prompts said data transmission circuit to stop transmission of said transmission data if codes thereof do not match.

15. A data transmission system comprising:
   a master apparatus;
   a plurality of slave apparatuses, each comprising:
      a data detection circuit that monitors transmission line data being transmitted in a transmission line connecting said master apparatus and said slave apparatuses; and
      a data transmission circuit; and
   a point-to-multi-point connection connecting said master apparatus to said slave apparatuses, wherein:
      said data detection circuit provided at each of said slave apparatuses counts a number of continuous codes indicating a specific logic level in said transmission line data that said data detection circuit monitors and prompts said data transmission circuit provided at each of said slave apparatuses to start transmission of transmission data when said number of continuous codes has reached a count value set for said detection circuit,
      said data detection circuit provided at each of said slave apparatuses prompts said data transmission circuit to stop transmitting upon detection of a predetermined condition, and
      said count value is reduced when said data detection circuit prompts said data transmission circuit to stop transmitting.

16. A data transmission system comprising:
   a master apparatus;
   a plurality of slave apparatuses, each comprising:
      a data detection circuit that monitors transmission line data being transmitted in a transmission line connecting said master apparatus and said slave apparatuses; and
      a data transmission circuit; and
   a point-to-multi-point connection connecting said master apparatus to said slave apparatuses, wherein:
      said data detection circuit provided at each of said slave apparatuses counts a number of continuous codes indicating a specific logic level in said transmission line data that said data detection circuit monitors and prompts said data transmission circuit provided at each of said slave apparatuses to start transmission of transmission data when said number of continuous codes has reached a count value set for said detection circuit,
      said data detection circuit provided at each of said slave apparatuses prompts said data transmission circuit to stop transmitting upon detection of a predetermined condition, and
      a transmission priority for a given slave apparatus is increased if its transmission is stopped and is decreased if its transmission is completed.

* * * * *